Patented May 4, 1943

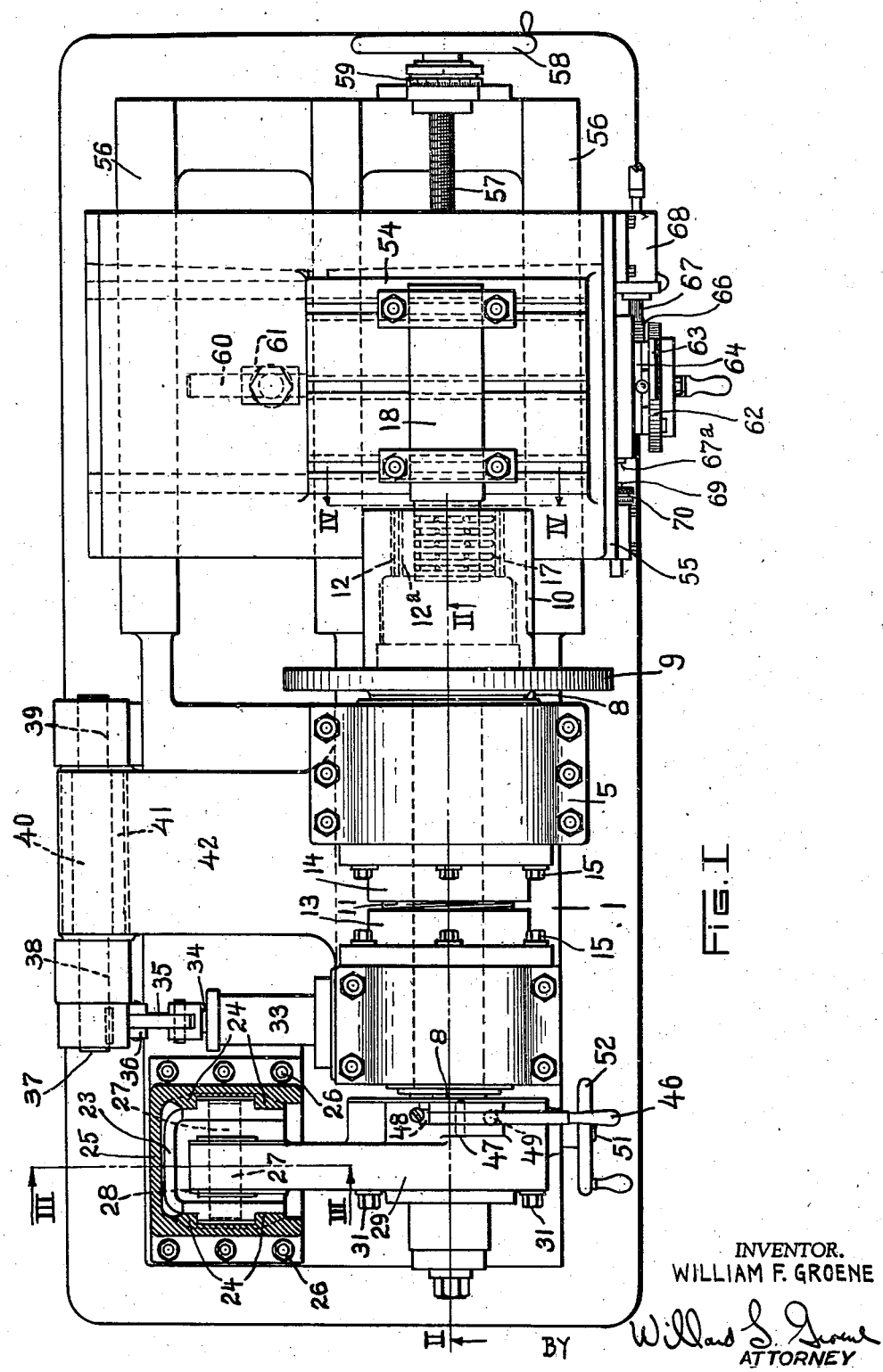

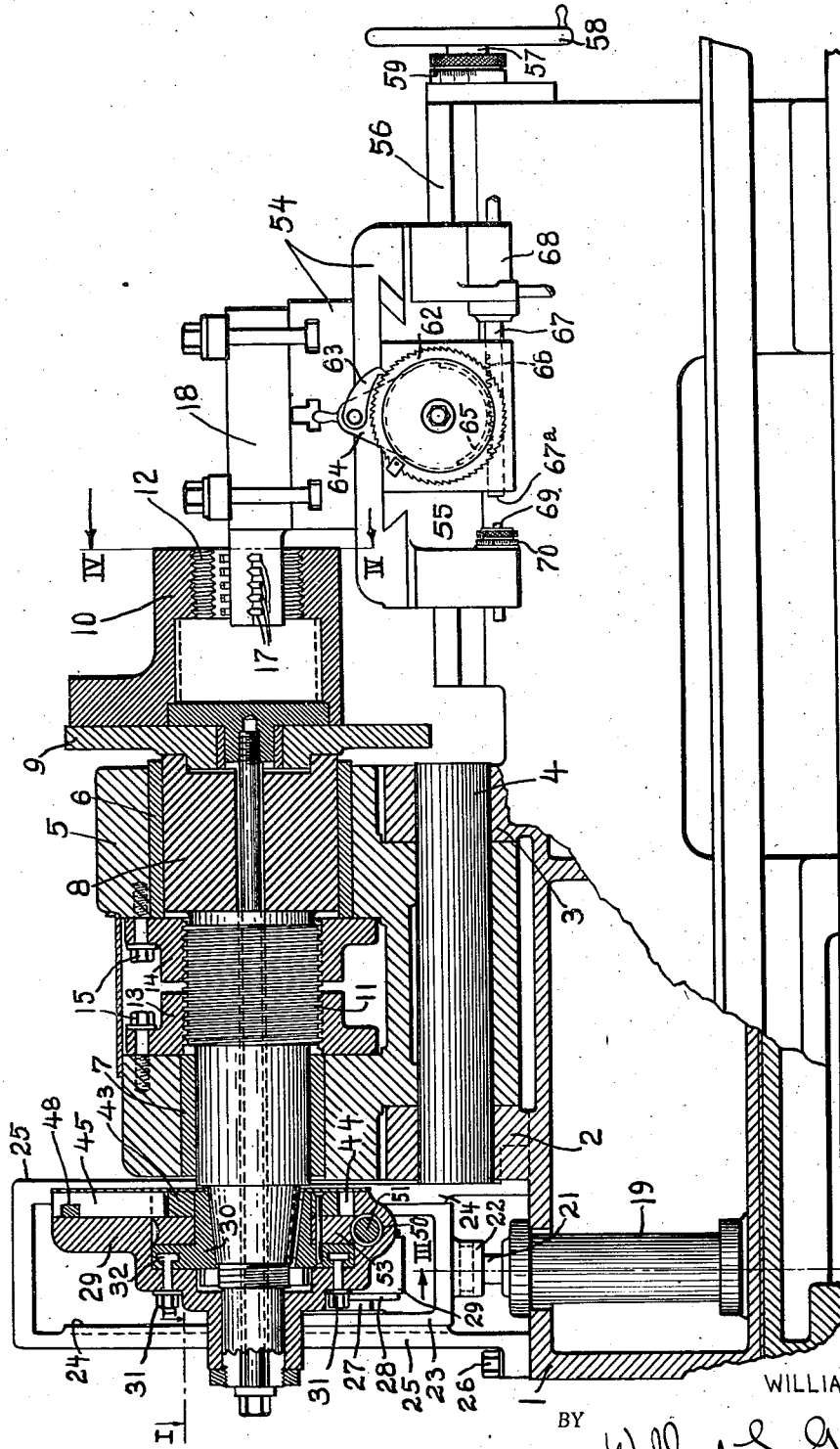
FIG. II.

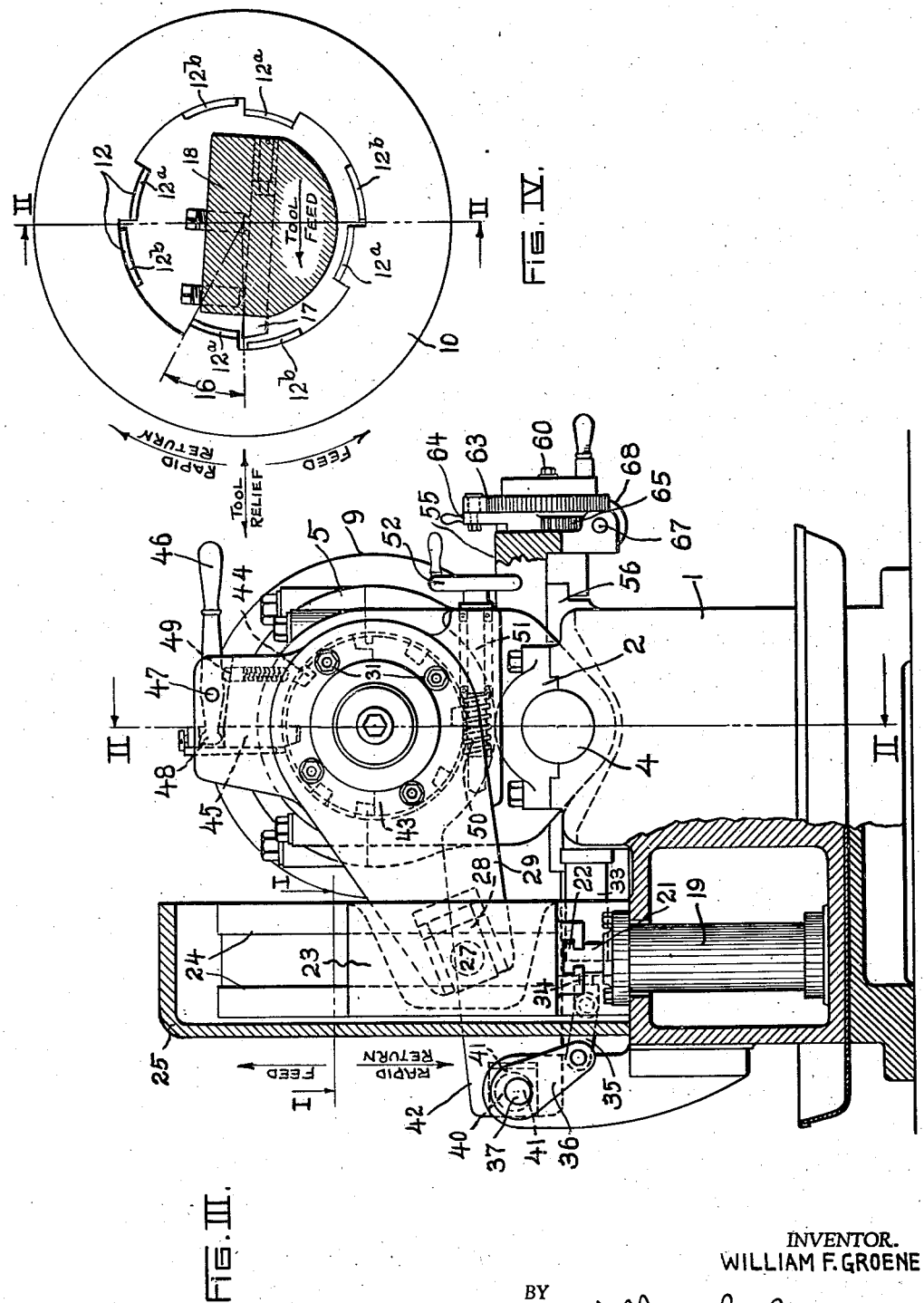

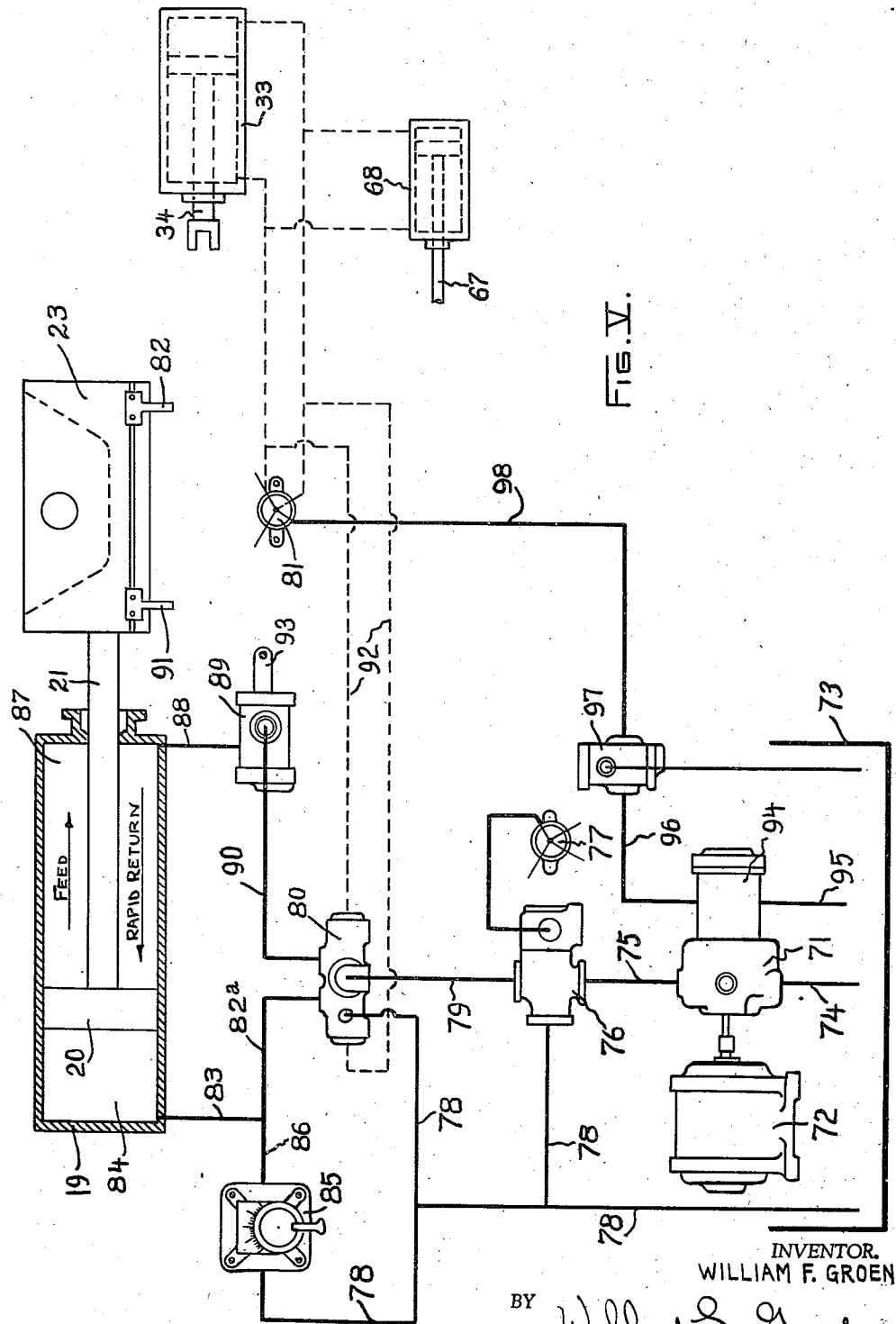

2,318,305

UNITED STATES PATENT OFFICE 2,318,305

CIRCULAR SHAPING MACHINE

William F. Groene, Cincinnati, Ohio, assignor to The R. K. Le Blond Machine Tool Company, Cincinnati, Ohio, a corporation of Delaware Application December 19, 1941, Serial No. 423,600

18 Claims. (Cl. 10—154)

This invention pertains to circular shaping machines, and is particularly related to machines adapted to cutting the step-threads on breech blocks and breech rings for guns. Because of the interrupted nature of such step-threads, it is found impractical to cut them by means of the more conventional step-threading attachment applied to a lathe in which the tool is oscillated back and forth for each of the step-threads while the work is rotated at a continuous cutting speed in one direction. This is due to limitations imposed by the difficulty of getting the tool to oscillate in and out sufficiently rapidly enough to take full advantage of the cutting speed at which the work might otherwise be rotated.

It is, therefore, the purpose of this arrangement to provide means for oscillating the work in one direction at a feeding speed and to rapidly return it backwards to its initial starting position at a rapid return motion and to apply cutting tool to each step of the threads to successively machine all of the steps by an oscillatory movement to the work rather than a continuously rotary movement to the work.

For exemplary purposes, this invention is shown applied to the specific problems of machining the breach ring of a gun as it typifies the type of operation to which this machine is especially adapted. The operation of the machine comprises essentially that of mounting a work piece on a work spindle and oscillating said work spindle at feed and rapid return rates through an arcuate motion just slightly greater than each step of the thread to be cut and to provide means for effecting a leading motion to cause the tool to follow the thread to be cut on the various steps in the breech ring, this latter motion is provided by utilizing a suitable nut and thread arrangement in conjunction with the work spindle so that, as it rotates, it will also move axially to produce the proper lead in the thread being cut. It is then the object during this arcuate and axial movement of the work spindle and work piece, to move a cutting tool progressively inwardly toward the work each time the work step-thread passes over it so as to progressively cut each of the step-threads in the breech ring.

It is, also, an object to coordinate the above motions with suitable apparatus to be described and to actuate these various elements in proper sequential relationship by appropriate control and hydraulic operating apparatus.

The advantage of this new construction is brought about by eliminating the necessity of rapidly oscillating a relative massive weighty tool holder and slide on the carriage of a lathe, as formerly done in step-threading attachment, by merely oscillating the work circularly at feed and rapid return rates while successively moving the cutting tools inwardly each time an oscillatory cycle of the work has been completed. In this way maximum cutting speed may be effected in the work oscillation so as to take full advantage of the cutting possibilities of the cutting tool and work while at the same time permitting the use of a series of cutting tools operating simultaneously on each step of the breech ring to be machined. The work is then indexed to each successive step of threads to be cut until the entire work piece has been completely threaded, the work spindle and indexing mechanism at all times maintaining the proper relationship of each step thread to the other during the cutting process.

Further features and advantages of this invention will appear in the drawings in which:

Figure I is a plan view partly in section on line I—I of Figure II, showing an exemplary embodiment of this invention applied specifically to the machining of a breech ring for a gun.

Figure II is a front elevational view of the machine of Figure I shown partly in section on the line II—II of Figures I and III.

Figure III is a left-hand end elevation of machine of Figure I and II shown partly in section on the line III—III of Figures I and II.

Figure IV is an enlarged view of the breech ring being machined and shown partly in section through the tool holder on line V—IV of Figures I and II.

Figure V is a diagrammatic showing of the hydraulic control and operating apparatus for the machine.

The particular machine here illustrated in detail and incorporating the principle of this invention is one provided for machining the internal thread of a breech block for gun. This machine comprises a base 1 having upwardly projecting portions 2 and 3 in which is fixed a pivot pin 4 upon which is pivotally mounted a headstock unit 5, which may thus have swinging movement perpendicular to the length of the base 1 of the machine. In this headstock 5 is carried a pair of bearings 6 and 7 in which is rotatably and slidably mounted the work spindle 8 carrying a suitable chuck plate 9 upon which is mounted the work or in this case the breech block 10. Between the bearings 6 and 7 and formed on the work spindle 8 is a threaded portion 11 having a thread whose lead is precisely identical with that of the lead of the thread 12 to be cut in the breech ring. The threaded portion 11 of the spindle 8 operates in a pair of nuts 13 and 14 carried in the headstock portion 5 and, by suitable screws 15, are appropriately adjusted relative to each other to effect a thread engagement of the threaded portion 11 with the nut 13 and 14 for the work spindle 8 which is free of all back-lash. In this way rotation of the work spindle 8 will effect an axial movement or lengthwise movement of the spindle 8 in the bearings 6 and 7 so as to maintain the lead for the thread 12 in the breech ring to be operated upon.

Noting particularly Figure IV, it can be seen that the work is oscillated in feed and rapid return motion through an arcuate path of travel 16 which is slightly larger than one of the step threads 12 to be cut. In this particular instance the cutting tools 17 are carried in the tool holder 18 and are shown applied to cutting one of the smaller diameter step threads 12a. This rotary oscillating feed and rapid return motion is provided by the hydraulic cylinder 19 having a piston 20 connected to a piston rod 21 which in turn is connected through a coupling arrangement 22, to a vertically reciprocatable slide 23 mounted in suitable guideways 24 in a housing member 25 appropriately fixed to the base 1 by suitable screws 26. This slide 23 carries a pin 27 fixed therein and about which is journaled, for rotary and axial sliding on said pin 27, an actuating shoe 28. This shoe 28 is permitted sliding motion but is confined from axial motion relative in the rocking arm 29. This arm 28 is arranged to be adjustably bolted to a flange piece 30 fixed on the work spindle 8 by means of suitable T-slot bolts 31 operating in the annular T-slot 32 formed in the flange piece 30. In this way, by appropriately applying fluid pressure to the cylinder 19 the work spindle is caused to rotate through the arc 16 of feed and rapid return for effecting a cutting action of the tool 17 on the thread 12a to be machined.

The work spindle 8 and headstock 5 are oscillated back and forth slightly with each feed and rapid return rotary movement of the work spindle. The purpose of this motion is to provide tool relief means for the cutting tool 17 so that it does not contact or drag upon the work surface or thread 12b being cut. This motion is provided by a fluid pressure cylinder 33 appropriately fixed on the frame 1 of the machine and having a piston rod 34 which is appropriately connected through a link 35 to a lever arm 36, Figures I and III, of an eccentric rock shaft 37 journaled in appropriate bearings 38 and 39 carried in the base 1 of the machine and having an eccentric portion 40 located intermediate these bearings which operates in a shoe 41 slidably mounted in the outer end of a projecting arm 42 formed integral with the headstock 5. Thus by appropriately operating the cylinder 33 the entire headstock may be rocked back and forth on the pivot pin 4 just a sufficient amount to prevent the tool rubbing over the thread being cut. During the forward stroke of the cylinder 33 moves the work spindle out to a precise accurate position each time to give the necessary definite depth of cut to the cutting tool.

Apparatus is also provided to permit the work spindle 8 to be indexed to various different positions relative to the rocking arm 29 to bring various different steps of threads 12a or threads 12b each in cutting position with respect to the tool 17. This apparatus comprises an indexing disc 43, Figures II and III, which is fixed to the member 30 and has a series of indexing notches 44 corresponding to each of the positions of the various step threads 12a and 12b and in which notches 44 operate an indexing plunger 45 carried in the rocking arm 29 and actuatable by means of a suitable control lever 46 carried on a pivot pin 47 in the rocking member 29 and having a suitable connection 48 with the index pin 45 and a spring urged detent 49 carried in the rocking member 29 which operates against lever 46 in such way as to ordinarily urge indexing plunger 45 into firm engagement with any selected one of the notches 44.

When the indexing plunger 45 is held out of the indexing notches 44 by pressing down on the lever 46, the spindle 8 may be rotated relative to the rocking arm 29 by means of a worm 50 carried on an appropriate worm shaft 51 which is journaled in the rocking member 29 and has a suitable manipulating hand wheel 52 so that the worm 50 may be rotated thereby and, since it is in engagement with a worm wheel 53 fixed to the member 30 on the work spindle, its rotation will effect relative rotation of the work spindle with respect to the member 29 when the T-slot bolts 31 are appropriately loosened to permit such rotation and the hand wheel 52 is thus manipulated to bring any of the respective indexing notches in proper alignment with the indexing plunger 45. In this way the work spindle may be rotated to any of the indexed positions to bring any of the different step threads into position and the fact that the threaded portion 11 of the work spindle is at all times operating in the nuts 13 and 14 proper lead relationship of the various step threads to one another will be at all times maintained for any indexed position of the work spindle with respect to the rocking arm member 29.

The tool holder 18 carrying the various cutting tools 17 is appropriately mounted on a cross slide 54 which in turn is carried on a suitable carriage 55 slidably mounted on the longitudinally extending ways 56 of the base 1 of the machine. This carriage 55 may be accurately positioned along the ways 56 to bring the tools 17 in proper lengthwise position in the bore of the breech ring to be threaded by the usual adjusting screw 57 operating in a nut (not shown) fixed to the underside of the carriage 55 and which screw may be rotated to accurate position by means of the hand wheel 58 and graduated collar 59.

The successive feeding of the tool 17 toward the work predetermined amounts after each rapid return oscillation of the work spindle 8 is effected by means of the cross feed screw 60 which operates in a nut 61 fixed to the cross slide 54 and which has at its front end a ratchet disc fixed thereon in which operates a pawl 63 carried on the oscillating bracket 64 which bracket has rack teeth 65 cut thereon which are actuated by rack teeth 66 cut in the piston rod 67 of the cross feed hydraulic cylinder 68, so that as this cylinder 68 is actuated the cross feed screw may be intermittently rotated a definite amount to cause the tool 17 to feed in a definite amount for each reciprocation of the work spindle. Accurate determination of the depth of each infeed movement may be determined by means of the plunger 69 which limits travel of the piston rod 67 by contact with its end 67a. The extent of movement effected by the cylinder 68 and this plunger 69 may be accurately set by means of suitable micrometer adjusting means 70.

Operation of the machine is as follows: When the machine is stopped the high pressure fluid pump 71, Figure V, which is driven from a suitable motor 72 is delivering fluid from the fluid reservoir 73 to the suction line 74 and into the pressure line 75 through the relief valve 76 and with the control valve 77 set in the stop position, fluid pressure from the line 75 passing through the relief valve 76 exhausts into the drain line 78 under no pressure. As soon as the control valve 77 is moved to "start" position the relief valve 76 is rendered operative whereupon high pressure is delivered from it through the line 79 into the control valve 80 which is set in the forward feed position, for example, by suitable operation of the pilot control valve 81 which has been actuated by the return stroke dog 82 fixed on the slide 23 so that fluid pressure from the line 79 will be transmitted through line 82a and line 83 into the feed pressure chamber 84 of the feed and reciprocating cylinder 19 to cause the slide 23 to move upwardly in feeding stroke at a predetermined slow rate as effected by the escape of fluid through the feed control valve 85 from line 86 into the drain line 78. Under these conditions fluid is also exhausted out of the chamber 87 of the cylinder 19 to the line 88 and the flow restricting valve 89 through the line 90, the valve 80, into the drain line 78. In this way a predetermined rate of speed for the rotary cutting movement of the work spindle 8 is effected by appropriately setting the feed control valve 85. When the end of the feeding stroke or full upward movement of the slide 23 has taken place its dog 91 again actuates the pilot control valve 81 and, through a suitable pilot control lines 92, the valve 80 is again operated to its opposite position whereupon high pressure fluid from line 79 then is transmitted to the line 90 and the valve 89 which, under these conditions, has its stem 93 also actuated by suitable means connected to the movement of the slide 23 so as to permit completely free flow of fluid from lines 90 into line 88 and into the chamber 87 of the cylinder 19 at very high volume and rapid flow so as to very rapidly return the piston 20 and the slide 23 to the initial beginning of the next feeding cycle. Under these conditions fluid is rapidly exhausted from the chamber 84 through lines 83, 82a, and the valve 80 feeding into the drain line 78. As the slide 23 again returns to its downward position its dog 82 again operates the pilot valve 81 to repeat the cycle just described. This reciprocating motion continues so long as the control valve 77 is set to permit high pressure from the pump 71 to be transmitted to the line 79 and may be stopped at any time by manipulating this valve 77 closing off this flow of fluid.

Also in timed relationship with the above reciprocatory motion for effecting the cutting and return of the work relative to the cutting tool 17, is also provided means for relieving the work from contact with the cutting tools during the rapid return stroke. This apparatus comprises the fluid pressure cylinder 33 which is appropriately connected to the pilot valve 81 so that fluid pressure from the low pressure fluid pump 94 may be transmitted from the suction line 95 through the pressure line 96, the pressure release valve 97, through the line 98 to it and be appropriately transmitted to one side or the other side of the cylinder 33 by actuation of the pilot control valve 81 by the dogs 82 and 91 of the slide 23, so that headstock 5 will be moved back away from the tools when the work spindle is rotating in rapid return motion and will be presented forwardly to accurate position by the reverse operation of the pilot valve 81 when the rotary feeding motion of the work spindle 8 is taking place.

Also the continual in-feeding of the cross slide 54 is also operated in sequential relationship to the reciprocatory rotational movement of the work spindle by means of the cylinder 68 which is likewise controlled from the pilot valve 81 to permit fluid pressure from the pump 94 to be presented to one or the other side of this cylinder 68 to effect the intermittent operation of the pawl 63 on the ratchet 62 for effecting the intermittent in-feeding of the tools at the return or during the return of the work spindle at rapid return rate. It is to be noted that in this case it is desirable to effect the in-feeding and relieving of the cutting tool relative to the work simultaneously and this is accomplished by making the tool release movement of greater amount than the in-feeding that occurs in the tool so that while the work is moved away from the tools in tool release motion the tools also are moved toward the work though not as far as the tool release motion to thereby effect both of these motions simultaneously during the return stroke with a great saving in time while at the same time preventing any rubbing contact of the cutting tools with the threads being cut on the work piece.

Having thus fully set forth and described this invention what is claimed is as follows:

1. In a circular shaping machine, a rotatable work spindle, means for oscillating said work spindle about its axis in feed and rapid return movement, a cutting tool, and means for presenting said cutting tool relative to said work spindle during said oscillating motion of said work spindle.

2. In a circular shaping machine, a work spindle, means for mounting a work piece on said work spindle, means for oscillating said work spindle in an arcuate path of feed and rapid return movement, a cutting tool, means for feeding said cutting tool relative to said work piece mounted on said work spindle during the arcuate rocking motion of said work spindle.

3. In a circular shaping machine, a rotatable work spindle, means for mounting a work piece on said work spindle, means for oscillating said work spindle through an arcuate path of feed and rapid return movement, a cutting tool, means for presenting said cutting tool to a work piece on said work spindle, and means for bodily moving said work spindle relative to said cutting tool to effect a tool relief motion.

4. In a circular shaping machine, a rotatable work spindle, means for mounting a work piece on said work spindle, means for oscillating said work spindle through an arcuate path of feed and rapid return travel, a cutting tool, means for presenting said cutting tool to a work piece on said work spindle, and means for actuating said work spindle axially during said arcuate motion of said work spindle.

5. In a circular shaping machine, a rotatable work spindle, means for mounting a work piece on said work spindle, means for oscillating said work spindle in an arcuate path of feed and rapid return movement, means controlled by said oscillating motion for effecting axial displacement of said spindle in sequential relationship to said arcuate motion thereof, and means for presenting a cutting tool to said work piece mounted on said work spindle.

6. In a circular shaping machine, a rotatable work spindle, means for mounting a work piece on said work spindle, means for oscillating said work spindle in an arcuate path of feed and rapid return movement, means controlled by said oscillating motion for effecting axial displacement of said spindle in sequential relationship to said arcuate motion thereof, and means for presenting a cutting tool to said work piece mounted on said work spindle, having means for intermittently moving said cutting tool toward said work piece in sequential relationship to the oscillating motion of said work spindle.

7. In a circular shaping machine, a rotatable work spindle, means for mounting a work piece on said work spindle, means for oscillating said work spindle in an arcuate path of feed and rapid return movement, means controlled by said oscillating motion for effecting axial displacement of said spindle in sequential relationship to said arcuate motion thereof, and means for presenting a cutting tool to said work piece mounted on said work spindle, having means for intermittently moving said cutting tool toward said work piece in sequential relationship to the oscillating motion of said work spindle, and means for bodily moving said work spindle to and from said cutting tool to effect a tool relief motion in said work spindle in sequential relationship to the arcuate motion of said work spindle.

8. In a circular shaping machine, a rotatable work spindle, means for mounting a work piece on said work spindle, means for oscillating said work spindle in an arcuate path of feed and rapid return movement, means controlled by said oscillating motion for effecting axial displacement of said spindle in sequential relationship to said arcuate motion thereof, and means for presenting a cutting tool to said work piece mounted on said work spindle, having means for intermittently moving said cutting tool toward said work piece in sequential relationship to the oscillating motion of said work spindle, and means for bodily moving said work spindle to and from said cutting tool to effect a tool relief motion in said work spindle in sequential relationship to the arcuate motion of said work spindle, and means for effecting axial adjustment of said cutting tool relative to said work spindle.

9. In a step threading machine, a base, a headstock mounted on said base, a work spindle rotatably mounted in said headstock, means on said spindle for mounting a work piece thereon, means on said base for oscillating said work spindle in feed and rapid return motion, a cutting tool mounted on a cross slide of said machine, means for mounting said cross slide on a carriage movable longitudinally of the base of said machine, and means for actuating said carriage and cross slide to present said cutting tool to a work piece on said work spindle.

10. In a step threading machine, a base, a headstock movably mounted on said base, a work spindle rotatably mounted in said headstock, means for oscillating said work spindle in said headstock in feed and rapid return motion, means for mounting a work piece on said work spindle, a cutting tool mounted on said base, means for moving said cutting tool relative to said work piece on said work spindle, and means for bodily moving said headstock relative to said cutting tool.

11. In a step threading machine, a base, a headstock mounted on said base, a work spindle rotatable in said headstock, means for oscillating said work spindle in feed and rapid return arcuate motion, means on said headstock for effecting axial lead motion in said work spindle when oscillated in said feed and rapid return motion, and a cutting tool mounted on said base for presentation to a work piece mounted on said work spindle.

12. In a step threading machine, a base, a headstock movably mounted on said base, a work spindle rotatably mounted in said headstock, means for oscillating said work spindle in an arcuate path of feed and rapid return motion, means on said headstock for effecting axial movement in said work spindle during said arcuate motion, a cutting tool mounted on said base, means for presenting said cutting tool to a work piece mounted on said work spindle, and means for bodily moving said headstock so as to move said work spindle and work piece relative to said cutting tool to effect a tool relief movement therein.

13. In a step threading machine, a base, a headstock mounted on said base, a work spindle rotatably mounted in said headstock, means for oscillating said work spindle in feed and rapid return motion through an arcuate path of travel, a cutting tool mounted on said base for presentation to a work piece mounted on said work spindle, and means for orienting said work spindle relative to said oscillating means in different indexed positions for effecting arcuate shaping operations on different parts of a work piece mounted on said work spindle.

14. In a circular shaping machine, a rotatable work spindle, means for oscillating said work spindle in an arcuate path of feed and rapid return motion, a cutting tool presentable to a work piece on said work spindle, and means for indexing said work spindle relative to said oscillating means to effect arcuate shaping operations on different portions of said work piece on said work spindle.

15. In a step threading machine, a base, a headstock pivotally mounted on said base for bodily oscillating swinging motion crosswise of the base of said machine, a work spindle journaled in said headstock lengthwise of said base, nut and screw means mounted on said headstock and associated with said work spindle to effect axial movement of said work spindle when oscillated in said headstock, means on said work spindle for effecting arcuate oscillating motion of said work spindle in feed and rapid return motion, power means on said base connected to said oscillating means, a cutting tool mounted on said base, and means for presenting said cutting tool to a work piece mounted on said work spindle.

16. In a step threading machine, a base, a headstock pivotally mounted on said base for bodily oscillating swinging motion crosswise of the base of said machine, a work spindle journaled in said headstock lengthwise of said base, nut and screw means mounted on said headstock and associated with said work spindle to effect axial movement of said work spindle when oscillated in said headstock, means on said work spindle for effecting arcuate oscillating motion of said work spindle in feed and rapid return motion, power means on said base connected to said oscillating means, a cutting tool mounted on said base, and means for presenting said cutting tool to a work piece mounted on said work spindle, means for bodily oscillating said headstock on said pivotal mounting, and means for intermittently moving said cutting tool toward said work piece on said work spindle.

17. In a step threading machine, a base, a headstock pivotally mounted on said base for bodily oscillating swinging motion crosswise of the base of said machine, a work spindle journaled in said headstock lengthwise of said base, nut and screw means mounted on said headstock and associated with said work spindle to effect axial movement of said work spindle when oscillated in said headstock, means on said work spindle for effecting arcuate oscillating motion of said work spindle in feed and rapid return motion, power means on said base connected to said oscillating means, a cutting tool mounted on said base, and means for presenting said cutting tool to a work piece mounted on said work spindle, means for effecting relative indexing of said work spindle with respect to said oscillating means, and means for bodily moving the headstock relative to said cutting tool in timed relationship to the rocking motion of said work spindle.

18. In a step threading machine, a base, a headstock pivotally mounted on said base for lateral swinging movement thereon, a work spindle journaled in said headstock for both rotary and axial movement therein, nut and screw means in said headstock associated with said work spindle for effecting said axial movement of said work spindle when rotated in said headstock, means for oscillating said work spindle through an arcuate path of feed and rapid return movement, means for indexing said work spindle relative to said oscillating means, power means on said frame for actuating said oscillating means, power means on said base for bodily oscillating said work spindle on its pivotal mounting, means for presenting a cutting tool in cutting position relative to a work piece mounted on said work spindle, and means on said tool holder for intermittently feeding said cutting tool toward the work piece on said work spindle in timed relationship to the oscillating motion of the work spindle and the oscillating motion of said headstock.

WILLIAM F. GROENE.